United States Patent [19]
Brennesholtz

[11] Patent Number: 5,654,775
[45] Date of Patent: Aug. 5, 1997

[54] THREE LAMP, THREE LIGHT VALVE PROJECTION SYSTEM

[75] Inventor: Matthew Scott Brennesholtz, Pleasantville, N.Y.

[73] Assignee: Philips Electronics North America Corporation, New York, N.Y.

[21] Appl. No.: 579,657

[22] Filed: Dec. 27, 1995

[51] Int. Cl.$^6$ .................... H04N 9/12; H04N 9/31
[52] U.S. Cl. .................... 348/742; 348/751; 348/758; 353/31; 353/48; 349/5
[58] Field of Search .................... 348/742, 743, 348/744, 750, 761, 756, 757, 758; 353/94, 31, 37, 48, 50, 51; 359/40, 41, 237, 246, 247; H04N 9/12, 9/31, 5/74

[56] References Cited

U.S. PATENT DOCUMENTS

| | | | |
|---|---|---|---|
| 4,090,219 | 5/1978 | Ernstoff et al. | 348/742 |
| 4,864,390 | 9/1989 | McKechnie et al. | 358/60 |
| 4,907,862 | 3/1990 | Suntola | 348/743 |
| 5,327,229 | 7/1994 | Konno et al. | 348/742 |
| 5,357,288 | 10/1994 | Hiroshima et al. | 348/742 |
| 5,386,250 | 1/1995 | Guerinot | 348/770 |
| 5,398,081 | 3/1995 | Jones | 348/758 |
| 5,428,408 | 6/1995 | Stanton | 348/742 |

*Primary Examiner*—Michael H. Lee
*Attorney, Agent, or Firm*—Jack D. Slobod

[57] ABSTRACT

In a three lamp, three light valve projection system, the lamps are energized sequentially in a three phase illumination cycle. The light therefrom is separated by an optical system composed of a three by three array of nine mirrors, all but one of which must be dichroic, to produce red, green, blue color sequential illumination of each light valve. Each light valve, which is controlled by a different control signal derived from an input video signal, is illuminated by a different color sequence such that during each phase of the illumination cycle, each light valve is illuminated by a different color. When the output beams from the light valves are converged over the same area of a screen, the phases of the illumination cycle occur at the field rate of the input video signal, whereas, when the output beams are arranged to produce a tiled image, the phases of the illumination cycle occur at three times the field rate.

12 Claims, 6 Drawing Sheets

THREE LAMP, THREE LIGHT VALVE PROJECTION SYSTEM

BACKGROUND OF THE INVENTION

1. Field of the Invention

The present invention relates to a projection system employing a plurality of lamps and a plurality of light valves, in particular, three lamps and three light valves.

2. Description of the Related Art

Light valves operating in a transmission or reflection mode, using liquid crystal, moving mirror, oil film, or other technologies are known for modulating a cross section of a light beam in two dimensions in response to a control signal. A key use of such light valves is in systems employing rear or front projection of light to display video images, in particular color video images.

A prior art light valve projection system sold by General Electric Company under the name "Talaria" utilized three lamps and three light valves. Each lamp was focused through associated dichroics onto a different associated one of the light valves. Each lamp and its associated dichroics and light valve produced an output beam at a different one of the three primary colors, red, green and blue. The disadvantage of this system is that because only one primary color is obtained from each lamp, only about ⅓ of the total output of the lamps is utilized.

It is also known from commonly owned U.S. Pat. No. 4,684,390 to separate light from a single lamp into three primary colors and apply each color to a different one of three light valves. One suitable lamp for this configuration is a 100 W UHP lamp from Philips Lighting. Because, brightness of the image produced may be marginal for large displays, this patent suggests the possibility of using two such lamps in closely spaced relationship. Also, the use of equal path lengths from the illumination subsystem to each of the light valves is disclosed.

Commonly-owned U.S. Pat. No. 5,386,250 describes a two lamp, one light valve projection system in which the two lamps are alternately active and a single light beam produced from the two sources by combining with a DMD is passed through a color wheel synchronized with the alternation of the lamps to illuminate the light valve sequentially with light of the three primary colors. In such a color sequential illumination system, color artifacts may be produced in the projected image because only one primary color is projected at a time. It should be understood that in such a prior art single light valve system, in order modulate each of the three primary colors during each field, the light valve must operate color sequentially at three times the field rate.

SUMMARY OF THE INVENTION

It is an object of the present invention to provide a projection system utilizing three lamps and three light valves in a manner having improved illumination efficiency, increased brightness, particularly for large displays, and which is substantially free of color artifacts.

It is a further object of the present to provide such an illumination system for producing a converged image in which the three light valves operate color sequentially at the field rate of the input video image, in a manner that all three primary colors are projected at the same time via the three light valves.

It is another object the present to provide such an illumination system for producing a tiled image in which the three light valves operate color sequentially at three times the field rate of the input video image.

Briefly, the aforementioned objects are satisfied by providing a projection system in which three output light beams are formed for projection on a screen in accordance with an illumination cycle having three phases for displaying a video image in response to an input video signal. The system comprises three light sources which are sequentially activatable during respective different phases of the illumination cycle, three light valves positioned for controlling respective different ones of the output light beams in response to said input video signal, and an optical system intermediate the three light sources and the three light valves made up of nine mirrors, at least eight of which are dichroic, for separating light from each light source into three primary colors and directing the input light of each primary color separated from the same light source to a different one of the three light valves. Each light valve sequentially receives input light in a different sequence of the three primary colors during the illumination cycle.

A control unit is provided for converting the input video signal to three different color sequential control signals, each controlling a different one of the three light valves and a power supply is provided for sequentially activating the three light sources during the respective different phases of the illumination cycle in response to a control output of the control unit.

In accordance with a first embodiment of the present invention, the projection lens subsystem at the output side of the light valves is configured for converging the three output light beams on the screen. In this embodiment, the phases of the illumination cycle occur at the field rate of the input video signal.

In accordance with a second embodiment of the present invention, the projection lens subsystem is configured for tiling the three output light beams on the screen. In this embodiment the entire illumination cycle occurs at the field rate of the input video signal.

Another feature of the present invention is that the optical system has a same optical path length path along each of the nine optical paths directed from each of the three light sources to each of the three light valves. This permits identical collimating lenses to be used just after each lamp and further identical lenses to be just before each light valve.

Still another feature of the present invention is that there is a same optical path length from each light valve to the screen. This permits identical projection optics to be used for each output beam.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 1A:
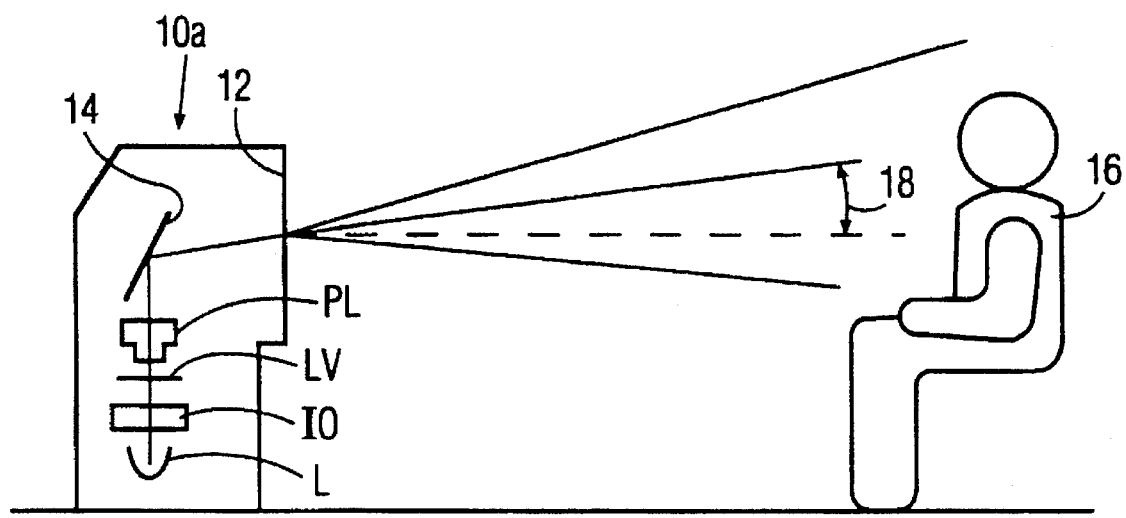
FIGS. 1a and 1b respectively illustrate typical rear and front projection video systems in which the invention is used including lamp, input optics, light valve and projection lens subsystems.
Figure 1B:
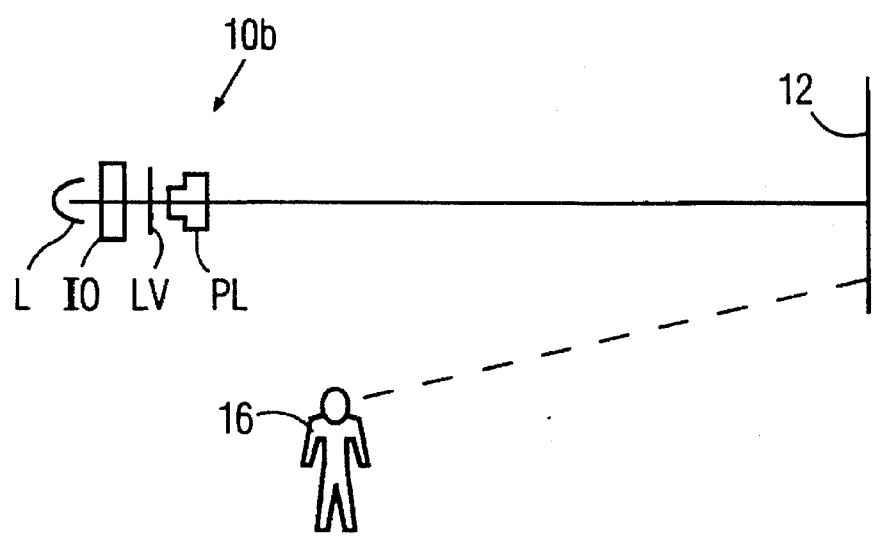

Referring first to FIG. 1a of the drawing, there is illustrated a typical rear projection video system 10a including a lamp subsystem L which via an input optics subsystem IO illuminates a light valve subsystem LV which modulates the input light in two dimensions. The modulated light is projected by a projection lens subsystem PL onto a translucent screen 12, typically via a mirror 14 which folds the projection path. Where the center of the screen 12 is below the height of the audience, the mirror 14 is angled so that the radiation exiting screen 13 is slightly upwardly directed to reach the observer 16 at an elevation angle 18 with respect to horizontal. In FIG. 1b, a typical front projection system 10b is illustrated where the projection lens subsystem projects modulated light on a screen 12 such that the light reaches the observer 16 by reflection from the screen.

Figure 2:
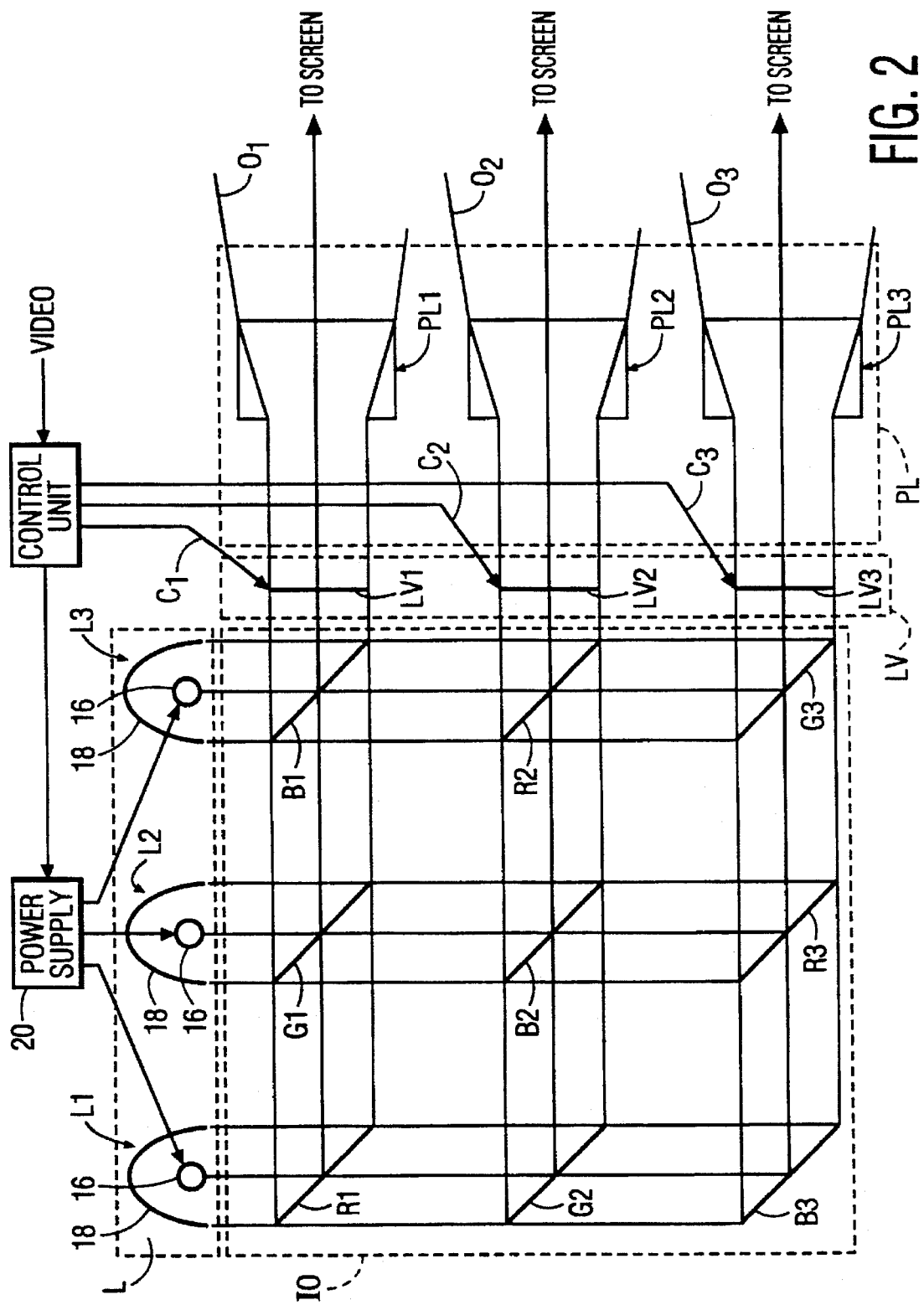
FIG. 2 is a schematic of the subsystems shown in both FIGS. 1a and 1b in accordance with the invention which produces three output light beams, and illustrating in particular a first embodiment of the input optics system.

Now referring to FIG. 2, the lamp subsystem L comprises three identical lamp units L1, L2 and L3, each composed of a lamp 16 which is preferably a 100 W high pressure discharge lamp, in view of its relatively high efficiency in lumens per watt, and a reflector 18. Lamp units L1, L2 and L3 illuminate a light valve subsystem LV composed of three light valves LV1, LV2 and LV3 via an input optical system composed of an array of nine mirrors R1, G1, B1, G2, B2, R2, B3, R3, and G3 arranged in three columns by three rows. Light modulated by the three light valves LV1, LV2 and LV3 is projected via projection lenses PL1, PL2 and PL3 respectively making up projection lens subsystem PL to form three output beams O1, O2 and O3 which are directed toward screen 12. There are nine optical paths between the lamp units L1, L2 and L3 and the light valves LV1, LV2 and LV3, each path characterized by including a reflection from a different one of the nine mirrors in input optics system IO. The column in which the mirror having the applicable reflection is located indicates which lamp unit is the source of the optical path and the row in which this mirror is located indicates which light valve is the destination of the optical path.

Also referring to FIG. 2, the lamp units L1, L2 and L3 are sequentially energized from power supply 20 in different phases P1, P2, P3 of a three-phase illumination cycle having a period T as in indicated in the line of FIG. 2 labeled L. Thus, each lamp unit operates at a ⅓ duty cycle. During the ⅓ of the time that a lamp 16 is energized it may operate at 300 W because the average from the lamp over the entire illumination cycle is 100 W.

Figure 3:
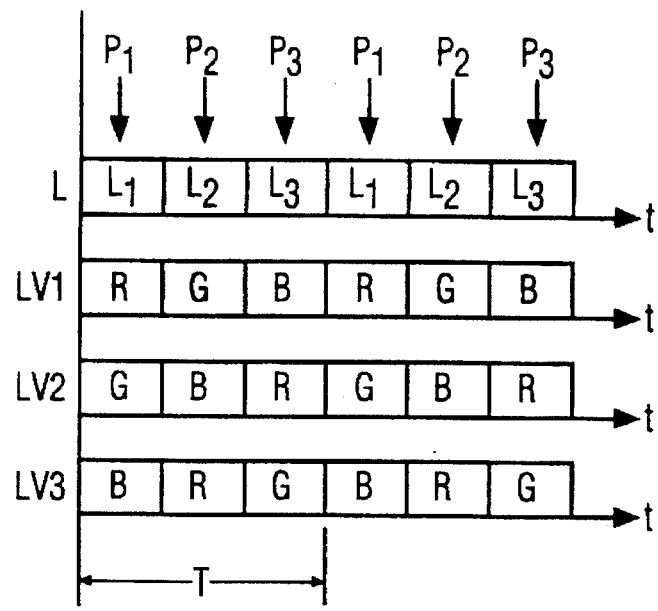
FIG. 3 is a timing diagram for the activation of lamps and illumination of light valves in FIG. 2.

Further, noting in FIG. 3 that the lines labeled LV1, LV2 and LV3 indicate the color with which the indicated light valve is illuminated during each phase of the illumination cycle, it should be apparent that input optics system IO directs red, green and blue light from lamp L1 to light valves LV1, LV2 and LV3, respectively, during the first phase P1, directs green, blue and red light from lamp L2 to light valves LV1, LV2 and LV3, respectively, during the second phase P2, and directs blue, red and green light from lamp L3 to light valves LV1, LV2 and LV3, respectively, during the third phase P3.

Referring to FIG. 2, it is pointed out that of the nine mirrors R1, G1, B1, G2, B2, R2, B3, R3, and G3, all but B3 must be dichroic. Light from lamp unit L1 first reaches mirror R1 which reflects red light toward dichroic mirror G1 while passing blue and green light produced by lamp L1 to mirror G2. Mirror G2 reflects green light produced by lamp unit L1 toward mirror B2 and is configured to pass blue light produced by lamp unit L1 to mirror B3 which reflects blue light toward mirror R3. Light from lamp unit L2 first reaches mirror G1 which reflects green light produced by lamp unit L2 toward mirror B1, while passing blue and red light produced by lamp unit L2 to mirror B2 and also is also configured to pass red light produced by lamp unit L1 toward mirror B1. Mirror B2 reflects blue light produced by lamp unit L2 toward mirror R2 and is configured to pass red light produced by lamp unit L2 toward mirror R3 and to pass green light reflected from mirror G2 toward mirror R2. Mirror R3 reflects red light produced by lamp unit L2 toward mirror G3 and is configured to pass blue light produced by lamp unit L1 toward mirror G3. Light from lamp unit L3 first reaches mirror B1 which reflects blue light produced by lamp unit L3 toward light valve LV1 and while passing red and green light produced by lamp unit L3 to mirror R2 and is also configured to pass red light produced by lamp unit L1 or green light produced by lamp unit L2 toward light valve LV1. Mirror R2 reflects red light produced by lamp unit L3 toward light valve LV2 while passing green light produced by lamp unit L3 toward mirror G3 and is also configured to pass green light produced by lamp unit L1 or blue light produced by lamp unit L2 toward light valve LV2. Mirror G3 reflects green light produced by lamp unit L3 toward light valve LV3 and is also configured to pass blue light produced by lamp unit L1 or red light produced by lamp unit L2 toward light valve LV3.

Input video feeds a control unit 22 which produces color sequential control signals for the light valves LV1, LV2 and LV3 on the control lines C1, C2 and C3, respectively, and also produces a control signal Cp for the power supply 20 to synchronize the three phase illumination cycle with the succession of fields in the input video signal. Control signal C1 controls modulation of the red light during phase P1, green light during phase P2, and blue light during phase P3 incident on light valve LV1. Similarly, control signal C2 controls modulation of the green light during phase P1, blue light during phase P2 and red light during phase P3 incident on light valve LV2, and control signal C3 controls modulation of the blue light during phase P1, red light during phase P2 and green light during phase P3 incident on light valve P3.

Figure 4:
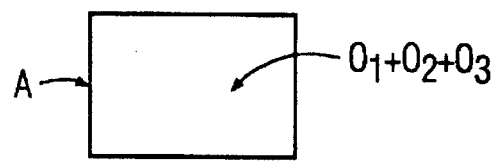
FIG. 4 illustrates a display produced in accordance with a first embodiment of the projection lens subsystem of FIG. 1, in which the three output beams of FIG. 2 form a converged image.

FIG. 4 illustrates a screen image I formed by a first embodiment of the projection lens subsystem PL where the output beams O1, O2 and O3 are converged over the entire rectangular area of image I. In this embodiment, the phases of the illumination cycle occur at the field rate of the input video signal (i.e. 60 Hz for NTSC, 50 Hz for PAL or SECAM) making the period T of the illumination cycle three times the field period. This allows light valves LV1, LV2 and LV3 to be operated at the field rate, albeit changing in the color controlled from one field to the next. This embodiment has the advantage that because all three colors are present in image I at the same instants, color artifacts are substantially eliminated.

Figure 5:
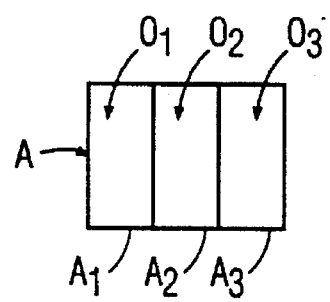
FIG. 5 illustrates a display produced in accordance with a second embodiment of the projection lens subsystem of FIGS. 1a and 1b, in which the three output beams of FIG. 2 form a tiled image.

FIG. 5 illustrates a screen image formed by a second embodiment of the projection lens subsystem PL where the output beams O1, O2 and O3 project to respective adjoining or tiled rectangular subimages A1, A2, and A3 which are edge matched to together form the image I. In this embodiment, the number of pixels in the image I is the sum of the pixels in the three light valves LV1, LV2, LV3 and the phases of the illumination cycle occur at three times the field rate of the input video signal (i.e. three times 60 Hz for NTSC, three times 50 Hz for PAL or SECAM). The period T of the illumination cycle is thus equal to the field period. Because the illumination cycle repeats at the field rate, light valves LV1, LV2 and LV3 are operated at three times the field rate.

Figure 6:
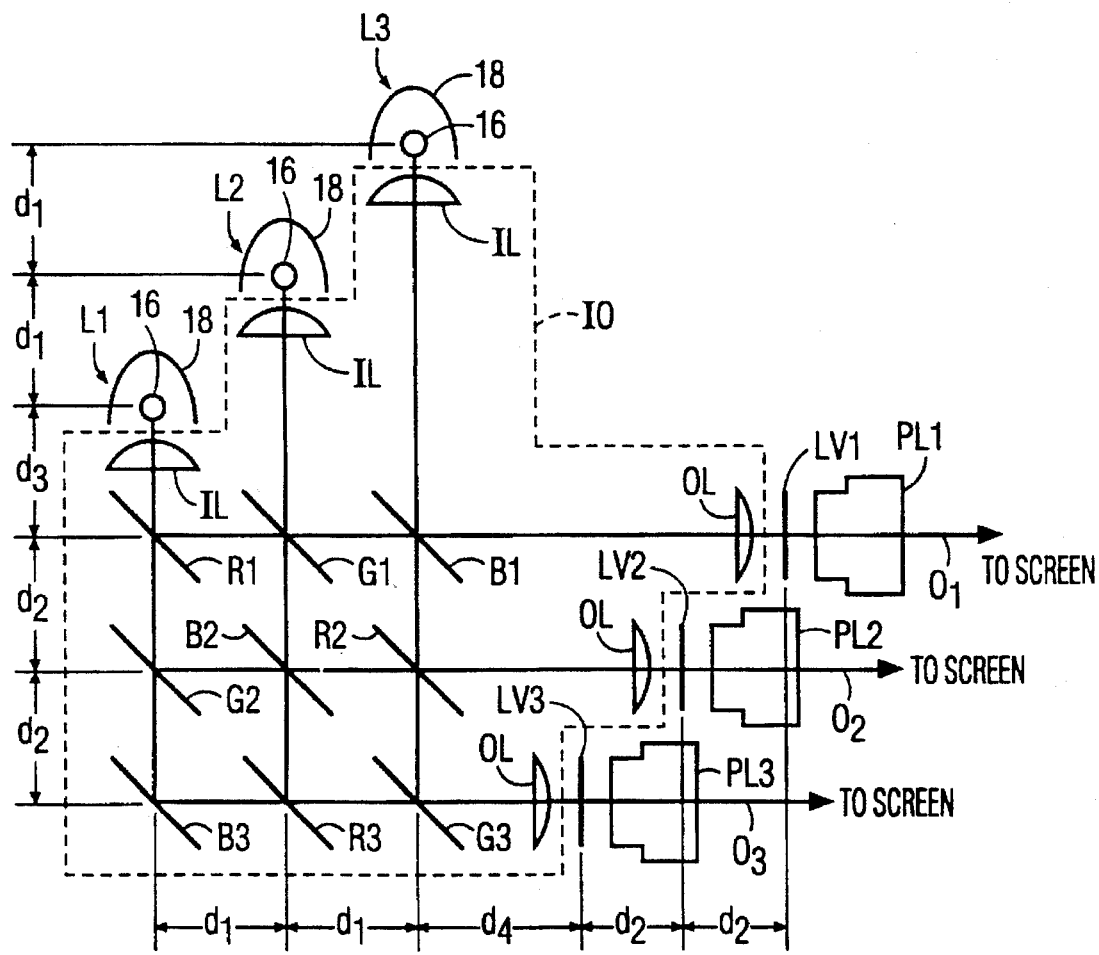
FIG. 6 is an alternate schematic of the subsystems shown in FIGS. 1a and 1b, which is similar to FIG. 2 but utilizes a second embodiment of the input optics subsystem.

FIG. 6 illustrates an alternate layout in which the lamp units L1, L2, L3 are staggered in distance from the mirrors R1, G1, B1, respectively, by the distance $d_1$ between columns of mirrors, and the light valves LV1, LV2, LV3 are staggered in distance from the mirrors B1, R2, and G3 by the distance $d_2$ between rows of mirrors. By examination of the distances indicated in FIG. 6, it should be appreciated that each of the nine optical paths between the lamps 16 of the light units L1, L2, L3 to the light valves LV1, LV2, LV3 has a same path length equal to $2d_1+2d_2+d_3+d_4$. This enables identical input field lenses IL to be located after light units L1, L2, L3 and identical output field lenses to be located before light valves LV1, LV2, LV3 for collimation purposes. The light valves and projection lenses are to be arranged such that the optical path length from each light valve to the screen 12 should be the same.

Figure 7:
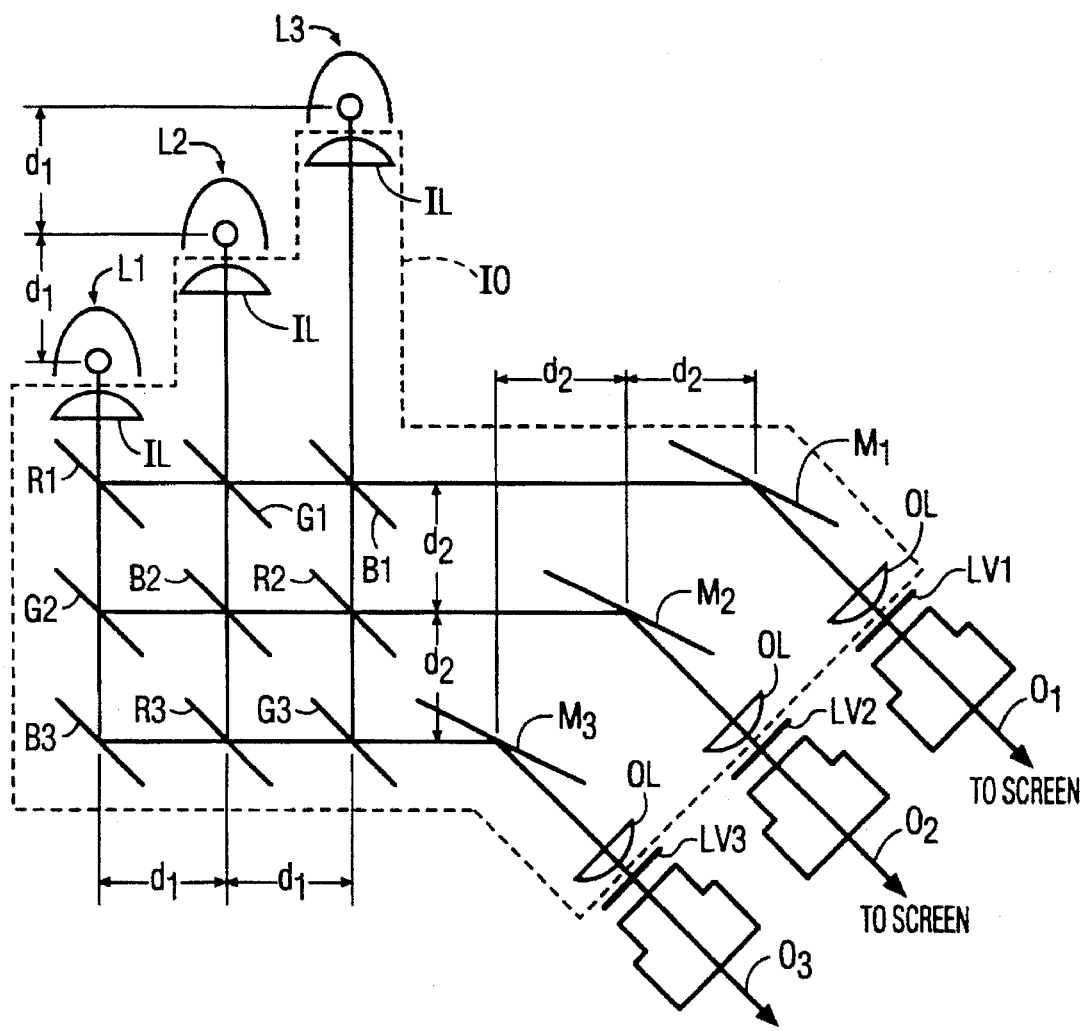
FIG. 7 is a further alternate schematic of the subsystems shown in FIGS. 1a and 1b, which is similar to FIGS. 2 and 6 but utilizes a third embodiment of the input optics subsystem.

FIG. 7 illustrates that the optical path lengths from light units L1, L2, L3 to light valves LV1, LV2, LV3 may be equalized by the introduction of mirrors M1, M2, M3 which fold the optical paths between mirrors B1, R2, G3 and light valves LV1, LV2, LV3. Because this arrangement allows the light valves LV1, LV2 and LV3 to lie in the same plane, the optical path length between the light valves and the screen 12 are easily made the same. Such a fold may be before or after the output lenses OL. The fold may be a 90° bend out of the plane of the paper.

Figure 8:
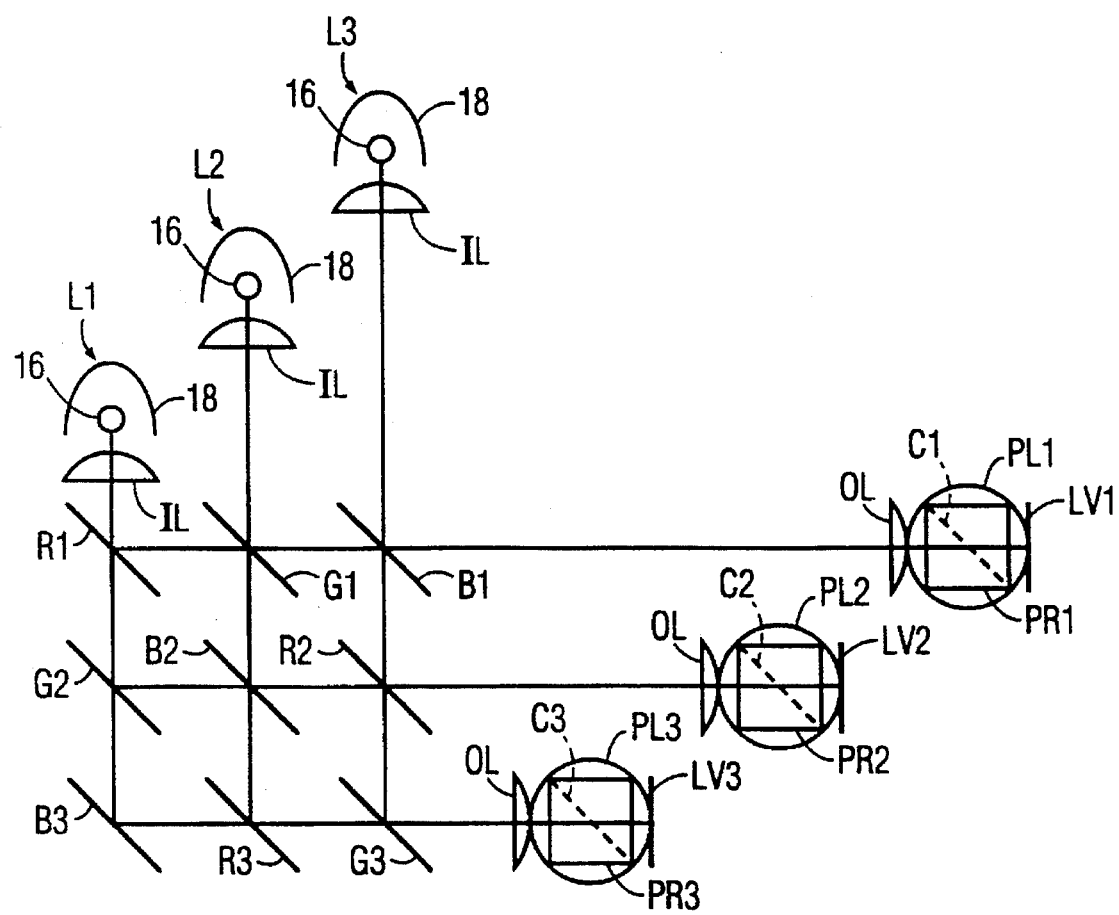
FIG. 8 is a further alternative schematic of the subsystems shown in FIGS. 1a and 1b, which is similar to the embodiment of FIG. 6, but uses reflective instead of tranmissive light valves.

In FIG. 8, reflective light valves LV1, LV2 and LV3 are used. The fold necessary to equalize path lengths between the three light valves LV1, LV2 and LV3 and the screen is prefereably combined with the fold necessary for a reflective light valve. Therein, the projection lenses PL1, PL2, PL3 are shown as circles because they direct light normal to the plane of the drawing. The squares PR1, PR2, PR3 represent prisms that split the incoming unmodulated light from the outgoing modulated light, i.e. the prisms direct the incoming light received from the output mirrors B1, R2 and G3 to the light valves but direct the modulated light reflect reflected from the light valves in a direction normal to the plane of the drawing. The beam splitting layers C1, C2 and C3 of the prisms PR1, PR2 and PR3 are shown rotated 90° from their correct positions. If shown correctly, the beam splitting layers would be coincident with the boundaries of prisms PR1, PR2 and PR3. If the light valves LV1, LV2, LV3 work on the principal of angular light separation, the beam splitting layers C1, C2 and C3 would typically be TIR air gaps. An example of this type of light valve is a deformable micromirrored device (DMD) available from Texas Instruments. If the light valves work on the basis of polarization, the beam splitting layers would typically be polarizing beam splitters. An example of this type of light valve is a twisted nematic liquid crystal display (TN-LCD).

Because of the nature of the field sequential illumination, a light valve having field at a time addressing is necessary for my invention. Most available light valves are not suitable because they incorporate a variation on a raster scan or a line at a time addressing. The aforementioned deformable micromirrored device (DMD) available from Texas Instruments is operable with field at a time addressing, and there is no theoretical reason why a LCD light valve could not be implemented for field at a time addressing. However, a transmissive LCD light valve would have a reduced aperture ratio due to the extra circuitry needed for field at a time addressing. The extra circuitry would not reduce the efficiency of a reflective light valve LCD. Consequently, at present, the embodiment of FIG. 8, utilizing a reflective light valve, is the most promising realization of the invention.

It should now be appreciated that the present invention provides a projection system utilizing three lamps and three light valves in a manner having improved illumination efficiency, increased brightness and which is substantially free of color artifacts.

Numerous modifications are possible within the intended spirit and scope of the invention. For example, other optical devices may be included to fold the optical path, improve light efficiency (such as integrators), improve color balance (such as color trim filters) and to correct for geometric distortion. The two dimensional array of lamp units, mirrors and light valves could be folded into a more compact three dimensional array. Further, mirrors in the array could be replaced by cyan, yellow or magenta mirrors. Lastly, the three light valves LV1, LV2, and LV3 could be integrated into a single light valve receiving three input light beams in tiled relationship. Such a single light valve is viewed functionally as containing three light valves. If the control signals C1, C2 and C3 are assembled into a single control signal, the single control signal is nonetheless viewed functionally as containing three control signals, a different one for each functional light valve.

What is claimed is:

1. A projection system in which three output light beams are formed for projection on a screen in accordance with an illumination cycle having three phases for displaying a video image in response to an input video signal, said system comprising:

three light sources which are sequentially activatable during respective different phases of the illumination cycle;

three light valves positioned for controlling respective different ones of the output light beams in response to said input video signal; and an optical system intermediate the three light sources and the three light valves for separating light from each light source into three colors and directing the light of each color separated from the same light source to a different one of the three light valves, in a manner that each light valve sequentially receives input light in a different sequence of the three colors during the illumination cycle.

2. The projection system as claimed in claim 1, further comprising means for converging the three output light beams projected onto the screen and wherein the phases of the illumination cycle occur at the field rate of the input video signal.

3. The projection system as claimed in claim 1, further comprising means for tiling the three output light beams projected onto the screen and wherein the illumination cycle occurs at the field rate of the input video signal.

4. The projection system as claimed in claim 1, wherein said optical system has a same optical path length from each of the three light sources to each of the three light valves.

5. The projection system of claim 4, further comprising another optical system intermediate the light valves and the screen providing a same optical path length from each of the three light valves to the screen.

6. The projection system as claimed in claim 2, wherein said optical system has a same optical path length from each of the three light sources to each of the three light valves.

7. The projection system of claim 6, further comprising another optical system intermediate the light valves and the screen providing a same optical path length from each of the three light valves to the screen.

8. The projection system as claimed in claim 3, wherein said optical system has a same optical path length along nine optical paths directed from each of the three light sources to each of the three light valves.

9. The projection system of claim 4, further comprising another optical system intermediate the light valves and the screen providing a same optical path length from each of the three light valves to the screen.

10. The projection system as claimed in claim 1, further comprising:

means for sequentially activating the three light sources during the respective different phases of the illumination cycle; and means for converting the input video signal to three different color sequential control signals, each controlling a different one of the three light valves.

11. The projection system as claimed in claim 2, further comprising:

means for sequentially activating the three light sources during the respective different phases of the illumination cycle; and means for converting the input video signal to three different color sequential control signals, each controlling a different one of the three light valves.

12. The projection system as claimed in claim 3, further comprising:

means for sequentially activating the three light sources during the respective different phases of the illumination cycle; and means for converting the input video signal to three different color sequential control signals, each controlling a different one of the three light valves.

* * * * *